United States Patent
Bahr et al.

(10) Patent No.: US 9,042,352 B2
(45) Date of Patent: May 26, 2015

(54) METHOD FOR DATA TRANSMISSION IN A LOCAL AREA NETWORK

(75) Inventors: Michael Bahr, Munich (DE); Norbert Vicari, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 585 days.

(21) Appl. No.: 13/145,314

(22) PCT Filed: Jan. 18, 2010

(86) PCT No.: PCT/EP2010/050493
§ 371 (c)(1),
(2), (4) Date: Jul. 19, 2011

(87) PCT Pub. No.: WO2010/081895
PCT Pub. Date: Jul. 22, 2010

(65) Prior Publication Data
US 2012/0020336 A1    Jan. 26, 2012

(30) Foreign Application Priority Data

Jan. 19, 2009    (EP) ..................................... 09000659
Aug. 10, 2009    (EP) ..................................... 09010309

(51) Int. Cl.
*H04J 3/00*    (2006.01)
*H04L 12/28*    (2006.01)
(Continued)

(52) U.S. Cl.
CPC .......... *H04W 74/02* (2013.01); *H04W 74/0816* (2013.01)

(58) Field of Classification Search
USPC ................................. 370/336; 709/208, 217
See application file for complete search history.

(56) References Cited

U.S. PATENT DOCUMENTS 7,881,340 B2 *   2/2011   Farrag et al. .................. 370/468
8,213,438 B2 *   7/2012   Larsen et al. ................. 370/400
(Continued)

FOREIGN PATENT DOCUMENTS

| CN | 1759577 | 4/2006 |
|----|---------|--------|
| CN | 1964353 | 5/2007 |
| EP | 1 150 462 | 10/2001 |
| JP | 5048610 A | 2/1993 |

OTHER PUBLICATIONS

Preject IEEE P802.15 Working Group for wireless personal Area Networks (APANs), Jul. 7, 2008 by Rui Zeng, Tae Rim Park, Myung J. Iee and Jong-Suk Chae.*

(Continued)

*Primary Examiner* — Faruk Hamza
*Assistant Examiner* — Abu-Sayeed Haque
(74) *Attorney, Agent, or Firm* — Cozen O'Connor

(57) ABSTRACT

A method for data transmission in a local area network, wherein data is transmitted on a medium access control layer within successive time frames between a plurality of first nodes comprising client nodes and a second node within reach of the first nodes, and a coordinator node for the first nodes where a time frame comprises a plurality of time slots. Each time slot is assigned to a first node that is a slot owner node being exclusively allowed to start transmitting data at a time within a first interval at the beginning of the time slot. At least one first nodes of the plurality of first nodes is allowed to use the time slot based on a contention based access to transmit the data in a second interval succeeding the first interval where the slot owner node has not started transmitting data at a time within the first interval.

24 Claims, 6 Drawing Sheets

(51) Int. Cl.
  *H04B 7/212* (2006.01)
  *H04W 4/00* (2009.01)
  *G06F 15/16* (2006.01)
  *H04W 74/02* (2009.01)
  *H04W 74/08* (2009.01)

(56) References Cited

U.S. PATENT DOCUMENTS

| | | | | |
|---|---|---|---|---|
| 8,325,686 | B2* | 12/2012 | Shao et al. | 370/337 |
| 2005/0239455 | A1* | 10/2005 | Stephens | 455/426.2 |
| 2008/0019343 | A1* | 1/2008 | Benveniste | 370/338 |
| 2008/0240146 | A1* | 10/2008 | Singh et al. | 370/458 |
| 2009/0268697 | A1* | 10/2009 | Jeon et al. | 370/336 |
| 2009/0310514 | A1* | 12/2009 | Jeon et al. | 370/254 |

OTHER PUBLICATIONS

An idle time slot Reuse Scheme for IEEE 802.15.3 High-Rate wireless Personal area networks by Euihyeok Kwon, Doyun Hwang and Jaesung Lim.*

IEEE P802.15 Wireless personal area network, by M. Bahr, mN.vicari and L.winkel.*

IEEE 802.15.3 high rate wireless personal area network.*

An Idle time slot Reuse Scheme for IEEE P802.15.3 high-Rate Wireless Personal Area Network.*

Proposal of factory automation (Aug. 30, 2008), by M.Bhar, N. Vicari and L.winkel.*

Bahr, M. et al. "Proposal for Factory Automation", Sep. 2008.

Bahr, M. et al. "Shared Group Timeslots", Institute of Electrical and Electronics Engineers (IEEE) 802-15, Nov. 2008, Document: 15-08/00827r0.

Standard 802.11™, "Part 11: Wireless LAN Medium Access Control (MAC) and Physical Layer (PHY) Specifications", Institute of Electrical and Electronics Engineers (IEEE), IEEE Computer Society, 2007.

Standard 802.15.4™, "Part 15.4: Wireless Medium Access Control (MAC) and Physical Layer (PHY) Specifications for Low-Rate Wireless Personal Area Networks (WPANs)", Institute of Electrical and Electronics Engineers (IEEE), IEEE Computer Society, 2006.

Bahr, M. et al. "Proposal for Factory Automation—MAC TG4e MAC Catergories", Institute of Electrical and Electronics Engineers (IEEE) 802.15, Siemens AG, Jan. 19, 2009.

* cited by examiner

FIG 3

| 1 | 1 | 1 | 2 | CTS-1 |
|---|---|---|---|---|
| SFC | FT = CTS-1 | NID | FCS | |
| MHR | MP | | MFR | |

FIG 4

| 1 | 1 | 1 | 1 | 2 | RTS |
|---|---|---|---|---|---|
| SFC | FT = RTS | SOA | NID | FCS | |
| MHR | MP | | | MFR | |

FIG 5

| 1 | 1 | 1 | 1 | 2 | CTS-2 |
|---|---|---|---|---|---|
| SFC | FT = CTS-2 | SDA | NID | FCS | |
| MHR | MP | | | MFR | |

METHOD FOR DATA TRANSMISSION IN A LOCAL AREA NETWORK

CROSS-REFERENCE TO RELATED APPLICATIONS

This is a U.S. national stage of application No. PCT/EP2010/050493 filed 18 Jan. 2010. Priority is claimed on EP Application No. 09000659 filed 19 Jan. 2009, and EP Application No. 09010309 filed 10 Aug. 2009, the contents of which are incorporated herein by reference in their entirety.

BACKGROUND OF THE INVENTION

Field of the Invention

The invention related to data communications networks and, more particularly to a method for data transmission in a local area network and to a corresponding network.

In the following, the term "local area network" refers to any type of network restricted to a local area, such as wireless local area network (WLAN) networks or personal area networks, e.g. according to the Institute of Electrical and Electronics Engineers (IEEE) standard 802.15.4.

For many applications, local area networks have to fulfil certain requirements with respect to a data transmission in the network. For example, in wireless factory automation sensor systems, in which the local area network comprises sensor nodes and a base station collecting data from the sensor nodes, cyclic data traffic characteristics have to be kept with respect to low latency and packet loss rates. To fulfil these requirements, certain mechanisms for a data transmission are provided in the L2 or Media Access (MAC) layer of the well-known Open Systems Interconnection (OSI) reference model. In local area networks, nodes often seek to transmit data at the same time, which may result in data collisions. Hence, mechanisms are provided for avoiding such collisions.

In IEEE 802: Part 15.4: Wireless Medium Access Control (MAC) and Physical Layer (PHY) Specifications for Low-Rate Wireless Personal Area Networks (WPANs) IEEE Std 802.15.4™, September 2006 referring to low-rate wireless personal area networks, a contention based data transmission using the Carrier Sense Multiple Access/Collision Avoidance (CSMA/CA) method is described. Due to this method, a time slot for data transmission is not assigned to a specific node, but each node in the network may use the wireless medium for data transmission. In order to avoid collisions, a node intending to send a data packet determines using a clear channel assessment whether the radio interface is free, i.e., whether another node is currently transmitting on the radio interface. In cases where no other data transmissions are detected by the node, it will start to transmit its data. In order to lower the risk of collisions with other nodes trying to send at the same time, the sending node waits a random delay before starting the clear channel assessment.

In the CSMA/CA method described in IEEE 802: Part 15.4: Wireless Medium Access Control (MAC) and Physical Layer (PHY) Specifications for Low-Rate Wireless Personal Area Networks (WPANs) IEEE Std 802.15.4™, September 2006, the so-called hidden node problem may occur. This problem is a situation in which two nodes in the network, which are out of reach with each other, intend to send data based on the CSMA/CA method to the same receiver. However, both nodes cannot hear each other. As a result, they will determine that the radio interface is free and will start sending data. This results in a data collision at the receiver. In order to recognize the effects of the hidden node problem, IEEE 802: Part 15.4: Wireless Medium Access Control (MAC) and Physical Layer (PHY) Specifications for Low-Rate Wireless Personal Area Networks (WPANs) IEEE Std 802.15.4™, September 2006 describes a mechanism by which a node transmitting data requests a positive acknowledgement from the receiver. If such an acknowledgement is not sent due to a collision caused by the hidden node problem, the data transmission of the node will be repeated.

In IEEE 802: Part 11: Wireless LAN Medium Access Control (MAC) and Physical Layer (PHY) Specifications IEEE Std 802.11™, June 2007 referring to the WLAN IEEE standard 802.11, a modified CSMA/CA method is described that includes a virtual carrier sense mechanism to avoid the hidden node problem.

According to this mechanism, a node wishing to transmit data reserves the radio interface for a predetermined time interval by sending a request-to-send packet to the receiver, where the packet includes the length of the time interval to be reserved. The receiver answers the request-to-send packet by sending a clear-to-send packet, which also includes the reserved time length, back to the sending node. The request-to-send and clear-to-send packets are broadcast in the network and all other nodes receiving those packets regard the radio interface as occupied for the time length specified in the packets. Particularly due to the transmission of the clear-to-send packets, nodes are informed about a forthcoming data transmission which is in reach of the receiver but not in their reach. IEEE 802: Part 11: Wireless LAN Medium Access Control (MAC) and Physical Layer (PHY) Specifications IEEE Std 802.11™, June 2007 also describes a clear to send-to-self mechanism where a sending node addresses a clear-to-send packet to itself. All neighboring nodes receiving this packet will refrain from transmitting data within the time length specified in the packet.

The above described hidden node problem will not only occur in contention based transmission methods but also in TDMA based transmission methods Time Division Multiple Access (TDMA). In TDMA based methods, each time slot in a corresponding time frame is reserved for a specific node being the slot owner node which can exclusively send in this time slot. In some TDMA based systems, a time slot may also be used by other nodes than the slot owner node in case that a data transmission cannot be detected by the other nodes after the expiry of a certain interval within the time slot. Such a TDMA based system is described in Michael Bahr, Norbert Vicari, Ludwig Winkel: Shared Group Timeslots IEEE 802.15-Dokument 15-08/0827r0, November 2008 referring to the proposal for standard IEEE 802.15.4e being an extension of standard IEEE 802.15.4 defined for a sensor network usable in factory automation environments. In the aforementioned TDMA systems the situation may occur in which a node that is not within reach of the slot owner node starts a data transmission that is in parallel to the slot owner node. This situation is to be avoided because a TDMA system guarantees to a certain extent that a slot owner node can transmit data in its time slot without any disturbances from other nodes.

SUMMARY OF THE INVENTION

It is therefore an object of the invention to provide a method for data transmission in a local area network by which a reliable time division (TDMA) based transmission combined with contention based access is achieved.

This and other objects and advantages are achieved by a local area network and method of the in which data is transmitted on the medium access control (MAC) layer within successive time frames between a plurality of first nodes comprising client nodes and a second node within reach of the first nodes and comprising a coordinator node for the first nodes. A respective time frame comprises a plurality of time slots and each time slot is assigned to a first node that is a slot owner node which is exclusively allowed to start transmitting data at a time within a first interval at the beginning of the time slot. This mechanism allows a time division multiple access (TDMA) based access for the slot owner node of the time slot.

The method of the invention also enables a contention based access for transmitting data. The term "contention based access" is to be interpreted broadly and refers to any method providing mechanisms scheduling a data transmission where different nodes can try to use the same time slot for transmitting data. In a preferred embodiment, the above mentioned CSMA/CA method is used as the contention based access.

To implement the contention based access, one or more first nodes of the plurality of first nodes, e.g., all first nodes or a subset of them, are allowed to use the time slot of a slot owner node using the contention based access for transmitting data in a second interval succeeding the first interval in cases in which a slot owner node has not started transmitting data within the first interval.

If the second node determines at the end of the first interval that the slot owner node has not started transmitting data, it will broadcast a permission message in the local are network. According to the invention, each first node is allowed to use the contention based access for transmitting data only after receiving the permission message from the second node.

The invention is based on using the coordinating second node in the network, which is within reach of all first nodes, to initiate a contention based data transmission by sending a corresponding permission message. Hence, all first nodes are informed explicitly about the fact that the slot owner node does not transmit data. Therefore, a hidden node that is not within reach of the slot owner node cannot start transmitting data parallel to a data transmission of the slot owner node. As a consequence, data collisions occurring at the second node are avoided, thus enhancing the reliability of the data transmission for the slot owner node.

In a preferred embodiment of the invention, the data is transmitted in a wireless personal area network, i.e., in a wireless sensor network, where each first node represents a sensor transmitting sensor data to the second node representing a base station in the sensor network. An example of such a network is described in Michael Bahr, Norbert Vicari, Ludwig Winkel: Proposal for Factory Automation, IEEE 802.15-Dokument 15-08/0572r0, August 2008. In the following, a sensor refers to a wireless device having the function to send data. If such a device also has the function of receiving data from the base station, it may also be called actuator. In a preferred embodiment, the data in the wireless personal area network is transmitted according to the aforementioned IEEE standard 802.15.4, i.e., in accordance with the standard proposal IEEE 802.15.4e provided for sensor and actuator networks for factory automation which is reflected in Michael Bahr, Norbert Vicari, Ludwig Winkel: Proposal for Factory Automation IEEE 802.15-Dokument 15-08/0572r0, August 2008.

The permission message sent by the second node in accordance with the method of the invention preferably includes at least an identification of its message type. This enables the first nodes to identify the message as a permission message. In another embodiment, the permission message further includes an identification of the second node and/or of the local area network to which the second node belongs. This enables the use of the method in a system of overlapping local area networks, where some of the first nodes belong to several local area networks with different second nodes. By including the identification of the network or the corresponding second node, different local area networks can be distinguished from each other.

In another preferred embodiment of the invention, the permission message is kept very short. This is possible because the permission message needs not include a reserved time length, as in the case in the above-described clear-to-send messages of the WLAN standard.

In another preferred embodiment of the invention, a second hidden node problem is solved. This second hidden node problem refers to a collision that may occur during the contention based access within the second time interval when two nodes intending to send data via the contention based access are out of reach from each other. To do so, each first node intending to use the time slot based on the contention based access for transmitting data at first broadcasts a request message in the local area network within the second time interval. Upon the first receipt of a request message at the second node, an admission message identifying the first node from which the request message originates is broadcast by the second node in the local area network. As a consequence, each first node receiving the admission message and not being identified in the admission message refrains from a data transmission, whereas the first node receiving the admission message and being identified in the admission message starts transmitting its data. Hence, the admission message sent by the first node ensures that only one node starts transmitting data even in cases in which the nodes intending to transmit data are not within reach of each other.

In a preferred embodiment, the above defined request message includes at least an identification of its message type and an identification of the first node that has sent the request message. As a result, the second node is able to determine the identification of the first node to be included in the admission message.

In order to ensure that the request messages sent by several first nodes do not collide, those messages are preferably sent based on a contention based access, i.e., by a CSMA/CA method.

In another embodiment of the invention, the admission message at least includes an identification of its message type and an identification of the first node from which the corresponding request message originates. As a result, a first node is able to determine whether it is allowed to transmit data by the contention based access.

In another embodiment of the method according to the invention, the request message and/or the admission message further include an identification of the second node and/or of the local area network to which the second node belongs. Due to this feature, the method of the invention may be used in a system of overlapping local area networks.

The request and/or admission messages can be very short. Particularly, those messages need not include a reserved time length, as in the case for the above described request-to-send packets and clear-to-send packets of the WLAN standard.

In another embodiment of the invention, the permission message and/or the request message and/or the admission message have a common command frame format, particularly the command frame format defined in the IEEE standard 801.15.4e. An example of such a command frame format is described in Michael Bahr, Norbert Vicari, Ludwig Winkel: Proposal for Factory Automation IEEE 802.15-Dokument 15-08/0572r0, August 2008.

In another embodiment of the invention, data transmissions from the first nodes to the second node are acknowledged by the second node. In a preferred embodiment, the second node sends an acknowledgement after receiving data from the slot owner node. This acknowledgement is preferably sent in a synchronizing or beacon slot at the beginning of the next time frame. Furthermore, the second node may send an acknowledgement after receiving data using the above described contention based access. This acknowledgement is preferably sent within the time slot in which the data is received by the contention based access.

In another embodiment of the invention, the time slot includes, in addition to the above-described first and second time intervals, a third time interval succeeding the second time interval that is used to send network announcements by the second node if no data is transmitted within the first and second time intervals.

Besides the above described method, the invention also provides a local area network comprising a plurality of first nodes comprising client nodes and a second node within reach of the first nodes and comprising a coordinator node for the first nodes, where the network is configured such that the method for data transmission in accordance with the method of the invention can be performed.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention will now be described in detail with respect to the accompanying drawings, in which:

FIG. 3 to FIG. 5 illustrate specific formats for messages being transmitted in accordance with an embodiment of the invention;

DETAILED DESCRIPTION OF THE PREFERRED EMBODIMENTS

In the following, an embodiment of the invention is described based on a data transmission according to the proposal to the Institute of Electrical and Electronics Engineers (IEEE) standard 802.15.4e. In general, the IEEE standard 802.15.4 defines the medium access control (MAC) layer according to the Open Systems Interconnection (OSI) reference model for wireless and low power transmission of sensor data. The proposal to the IEEE standard 802.15.4e is a specific amendment of IEEE standard 802.15.4 used for data transmission between sensors and actuators in factory automation. A sensor refers to a wireless device designed for transmitting data to a base station or gateway. A device having the functionality of a sensor and which is additionally able to handle data transmissions from the base station to the device is called actuator. Hence, an actuator can be regarded as a sensor having the additional functionality of a downlink transmission from the gateway to the actuator. In accordance with the invention, a sensor or actuator corresponds to a first node, whereas the gateway or base station corresponds to a second node.

As previously explained, the IEEE standard 802.15.4e is designed for factory automation, where sensors and actuators are located, for example, at robots, suspension tracks and portable tools in the automotive industry and collect data on machine tools, such as milling or turning machines, and control revolving robots. Further application areas are control of conveyor belts in cargo or logistics scenarios or special engineering machines. Depending on the specific needs on different factory automation branches, many more examples can be named. Common to sensor applications in factory automation is the requirement of low latency and high cyclic determinism. As a consequence, the performance should allow for reading sensor data from 20 sensors within 10 milliseconds. The IEEE standard 802.15.4e fulfils the needs of factory automation by using a fine granular Time Division Multiple Access (TDMA) access, where in a superframe structure guaranteed time slots for deterministic access are assigned to corresponding first nodes.

Figure 1:
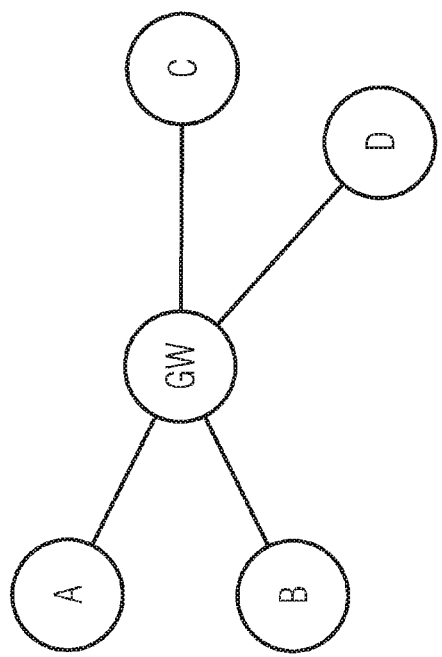
FIG. 1 is an exemplary illustration of a personal area network in which an embodiment of the method in accordance with the invention is implemented.

FIG. 1 shows an example of a wireless sensor network in a star topology of the IEEE standard 802.15.4e. The network comprises four first nodes A, B, C and D, i.e., corresponding sensors or actuators, communicating with a second node GW comprising a gateway to the wireless network. Based on the star topology shown in FIG. 1, where all data transmissions are directed from a first node to the second node or all data transmissions are directed from the second node to first node.

Figure 2:
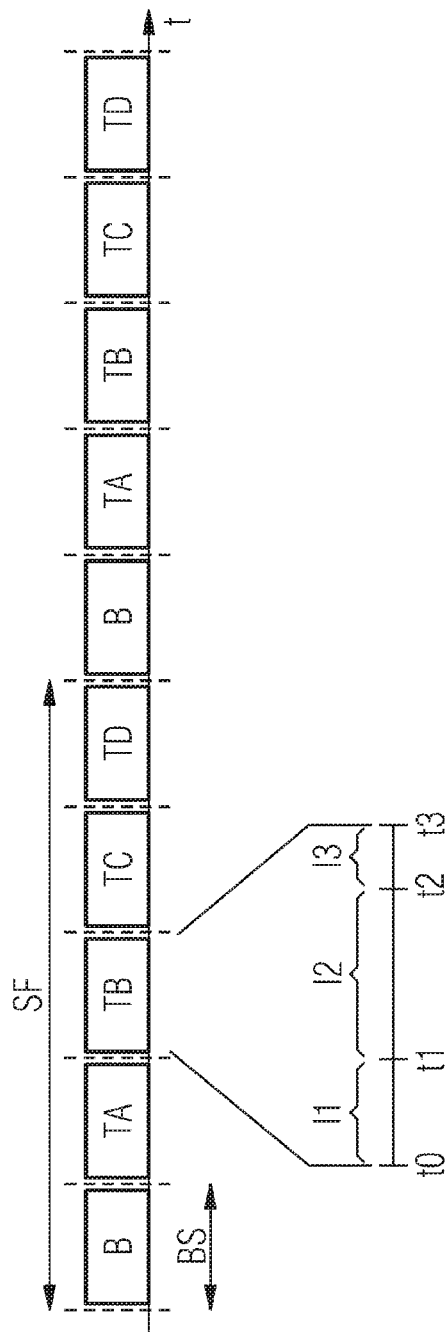
FIG. 2 is an illustration of a structure of successive time frames used for transmitting data in accordance with an embodiment of the invention.

In accordance with the method of the invention, data is transmitted from the corresponding first nodes A to D to the coordinating second node GW in successive time frames. Those time frames are illustrated in FIG. 2. With specific reference to FIG. 2, shown therein along the horizontal time axis t are two successive time frames, where each time frame refers to a superframe SF and comprises a synchronizing time slot BS at the beginning and a plurality of transmission slots TA, TB, TC and TD used for data transmissions following the synchronizing time slot BS. The synchronizing time slot BS includes a beacon B that is used for synchronizing the data transmission between the first nodes A to D and the second node GW. Moreover, the beacon B includes acknowledgements indicating whether TDMA based data transmissions in the transmission frame of a preceding superframe have been successful.

Each of the time slots TA to TD forms a shared group time slot in which several smaller time slot units of equal length are concatenated. In accordance with the invention, a shared group time slot corresponds to a time slot. In the example of FIG. 2, each of the time slots TA to TD is assigned to a fixed first node (also called slot owner node in the following) in the network of FIG. 1. Particularly, time slot TA is assigned to first node A, time slot TB is assigned to first node B, time slot TC is assigned to first node C and time slot TD is assigned to first node D. Based on this assignment, a TDMA based method is used for transmitting data by a corresponding first node in the time slot assigned to this first node.

The method as described herein combines a TDMA based data transmission with a contention based data transmission using a Carrier Sense Multiple Access/Collision Avoidance (CSMA/CA) method. The CSMA/CA method for data transmission is used in a time slot in cases in which the time slot is not used by the corresponding slot owner node. To do so, each of the time slots TA to TD is divided in further sub-intervals. The structure of these sub-intervals is shown in FIG. 2 for the time slot TB. This structure is the same for all other shared group time slots within the transmission frame TF.

As shown in FIG. 2, a shared group time slot extends from a start time t0 to an end time t3. Here, the interval between those times is divided into three fixed time intervals I1, I2 and I3. The time interval I1 extends from time t0 to time t1, the time interval I2 extends from time t1 to time t2 and the time interval I3 extends from time t2 to time t3. In accordance with the subsequently described embodiment, the use of a shared group time slot is to a certain extend guaranteed for the slot owner node. Particularly, the slot owner node has the exclusive right to start a data transmission within the interval I1 of its time slot. Only if the slot owner node does not start a data transmission within this time interval, is a CSMA/CA method then used for data transmission within the succeeding interval I2 of the shared group time slot. According to the CSMA/CA method, each of the first nodes A to D can try to send data within the time interval I2. If no data is transmitted within the time interval I2 by any of the first nodes A to D, then the gateway GW uses the succeeding time interval I3 to announce the network by corresponding announcement messages.

The method as-described corresponds to the transmission method described in Michael Bahr, Norbert Vicari, Ludwig Winkel: Shared Group Timeslots IEEE 802.15-Dokument 15-08/0827r0, November 2008. The invention described subsequently provides improvements of the conventional method and solves the hidden node problem that may occur when using the method of Michael Bahr, Norbert Vicari, Ludwig Winkel: Shared Group Timeslots IEEE 802.15-Dokument 15-08/0827r0, November 2008. This hidden node problem is herein illustrated based on FIG. 1. In the network of FIG. 1, a star topology ensures that the gateway GW is within reach of each first node A, B, C and D. Nevertheless, there is no guarantee that each first node is within reach of all the other first nodes in the network. In accordance with the situation shown in FIG. 1, sensor nodes A and B are within reach of each other and sensor nodes C and D are within reach of each other. However, sensor nodes A and B are not within reach of sensor nodes C and D. Hence, first nodes C and D are hidden nodes for first nodes A and B. Therefore, in case in which first node A or B transmits data in its corresponding time slot assigned to it, where first nodes C and D will not detect those data transmissions. Hence, first nodes C and D may send data within interval I2 of time slot TA or TB based on a CSMA/CA method in parallel to a transmission by first node A or B in the corresponding time slots A or B because both first nodes C and D will detect a clear channel. Consequently, unacceptable data collisions will occur because there is a certain guarantee for the first nodes A and B to be able to transmit data within the corresponding time slots TA and TB.

In accordance with the method of the invention, the above described hidden node problem is solved by broadcasting a clear-to-send (CTS) packet (by the second node GW. This packet is designated in FIG. 3 as CTS-1 and comprises an embodiment of a permission message. Particularly, in cases in which the second node GW detects, after the expiry of the interval I1 that the corresponding slot owner node has not started a data transmission, the second node GW will broadcast the CTS packet to all first nodes in the network. The format of the packet CTS-1 is illustrated in FIG. 3 and is based on the command frame structure as defined in Michael Bahr, Norbert Vicari, Ludwig Winkel: Proposal for Factory Automation IEEE 802.15-Dokument 15-08/0572r0, August 2008.

According to FIG. 3, the first line of the format indicates the length of the corresponding sub-units of the packet CTS-1 in octets, i.e., in bytes. The CTS packet comprises a MAC header MHR, a MAC payload MP and a MAC footer MFR. The MAC header has a length of 1 byte and includes a shortened frame control field SFC specifying a frame type. The structure of this shortened frame control field is described in Michael Bahr, Norbert Vicari, Ludwig Winkel: Proposal for Factory Automation IEEE 802.15-Dokument 15-08/0572r0, August 2008. In the formats of FIG. 3 to FIG. 5, the shortened frame control field SFC indicates that the frame is a command frame. The MAC header MHR is followed by the MAC payload MP comprising two fields of one byte length. The first field specifies that the command frame type FT is a first type of CTS packet. The second field includes a network ID NID which specifies the network in which the CTS message CTS-1 is transmitted.

Instead of a network identification, the second field may specify the identification of the corresponding gateway GW, e.g., the sending address of the gateway. The use of the network ID or the gateway identification is optional and only relevant in cases in which there are more than one overlapping networks of the type shown in FIG. 1 to distinguish the messages sent in the different networks. The CTS message CTS-1 includes a final field having the length of two bytes. This field is the MAC footer and includes a frame check sequence FCS corresponding to a checksum for the packet. The structure of the MAC footer is also described in the aforementioned Michael Bahr, Norbert Vicari, Ludwig Winkel: Proposal for Factory Automation IEEE 802.15-Dokument 15-08/0572r0, August 2008 document.

In accordance with the disclosed embodiments of the invention as described herein, the trigger for allowing a contention based data transmission is not the expiry of time interval I1 but the receipt of the above described packet CTS-1. As a consequence, the above described hidden node problem is solved because the gateway GW is within reach of all first nodes so that it is ensured that data is not transmitted by the slot owner node when the CTS packet CTS-1 is broadcast by the second node. The packet CTS-1 according to FIG. 3 does not indicate a time interval, contrary to CTS packets sent in the WLAN standard. This is because the packet CTS-1 does not have the function of reserving the radio interface in the network for a predetermined time. Rather, the packet informs all first nodes in the network that the nodes are allowed to send data based on a CSMA/CA method. All nodes in the network know the length of the interval I2 from the network configuration. Hence, the nodes know which frame they can transmit using a contention based access within the interval I2.

In the above-described scenario, another second hidden node problem may occur during the contention based access within the time interval I2. This is because a node wishing to send data packets within the time interval I2 listens to the radio interface to check if the interface is free, i.e., whether it is possible to send data. Hence, in the network illustrated in FIG. 1, a data collision will occur when first node A or B and also first node C or D intend to send data using a contention based access because nodes A and B are not within reach of nodes C and D. This second hidden node problem is not as severe as the above described hidden node problem because the contention based access does not give a guarantee for the nodes to transmit data, contrary to the TDMA based scheme as previously described in which each first node owns a certain time slot reserved for this node.

In an alternative embodiment, the second hidden node problem is also solved. Here, after all first nodes have received the above described packet CTS-1 from the second node GW, those first nodes wishing to send data on a contention based access within the time interval I2 initially transmit request-to-send packet RTS to the gateway GW. This RTS packet forms an embodiment of a request message. The transmission of the packet RTS is performed on a CSMA/CA method, i.e., those nodes wishing to send this packet will delay the transmission by a random time. This mechanism ensures that almost always only one RTS packet reaches the gateway GW.

The format of the request-to-send packet RTS is shown in FIG. 4. As with packet CTS-1, this format is based on the command frame format described in Michael Bahr, Norbert Vicari, Ludwig Winkel: Proposal for Factory Automation IEEE 802.15-Dokument 15-08/0572r0, August 2008. Correspondingly with FIG. 3, the first line in the packet RTS indicates the length of the respective fields, where the number refers to the length in bytes. The packet in FIG. 4 has a similar structure as the packet in FIG. 3. Particularly, the packet in FIG. 4 includes a MAC header MHR comprising a shortened frame control field SFC, a MAC payload MP and a MAC footer FTR comprising a frame check sequence FCS of two byte length. The MAC payload MP of the packet RTS includes three fields each having one byte length, whereas the MAC payload of the packet CTS-1 only includes two bytes. The MAC payload of the packet RTS includes a first field which indicates that the frame type FT is an RTS packet. Additionally, the packet RTS includes an identification of the first node which has sent this packet. This is indicated by a short originator address SOA in a second field of the MAC payload MP. In addition, a network identification NID is included in the MAC payload of the packet RTS. This NID specifies the network to which the first node sending the packet belongs. Instead of the network identification, the network address of the gateway GW may be included in the last field of the MAC payload. As with the packet CTS-1, the network identification is optional and only relevant when several overlapping networks exist. A time interval needs not be indicated in the packet RTS.

After the gateway GW has received the above described packet RTS, the gateway GW will immediately broadcast a second type of clear-to-send packet CTS-2, the structure of which is shown in FIG. 5. This CTS-2 packet comprises an embodiment of an admission message. The format of the packet CTS-2 is similar to the format of the packet RTS shown in FIG. 4. As before, the format of the packet CTS-2 is based on the command frame format defined in Michael Bahr, Norbert Vicari, Ludwig Winkel Proposal for Factory Automation IEEE 802.15-Dokument 15-08/0572r0, August 2008. Correspondingly with the packets of FIG. 3 and FIG. 4, the first line in the packet format of FIG. 5 indicates the byte length of the corresponding fields of the packet. The packet CTS-2 includes a MAC header MHR comprising a shortened frame control field SFC, a MAC payload MP and a MAC footer MFR including a frame check sequence FCS. The MAC payload MP includes in a first field an indication that the command frame type FT is a CTS-2 packet. In a second field of the MAC payload MP, the address of the first node from which the former packet RTS was received by the second node is included as a short destination address SDA. Furthermore, the identification NID of the network is included in the last field of the MAC payload MP. Instead of this network identification, an identification of the gateway GW may be included in this field. As before, the field of the network identification is optional and only relevant in cases in which several overlapping networks exist. A time interval need not be included in the packet CTS-2.

The packet CTS-2 is received by all first nodes in the network. Those first nodes having another address as the short destination address SDA indicated in the packet CTS-2 will refrain from transmitting data within the time interval I2. Contrary to that, the first node having the short destination address indicated in the packet CTS-2 will start transmitting data in the time interval I2. The gateway GW is within reach for all first nodes. As a result, the packet CTS-2 will be received by all first nodes. Hence, it is ensured that the first node specified in the packet CTS-2 will receive the packet. Furthermore, this node will be the only node which uses the time interval I2 for a data transmission. Consequently, collisions are avoided and the second hidden node problem as specified above is solved.

Figure 6:
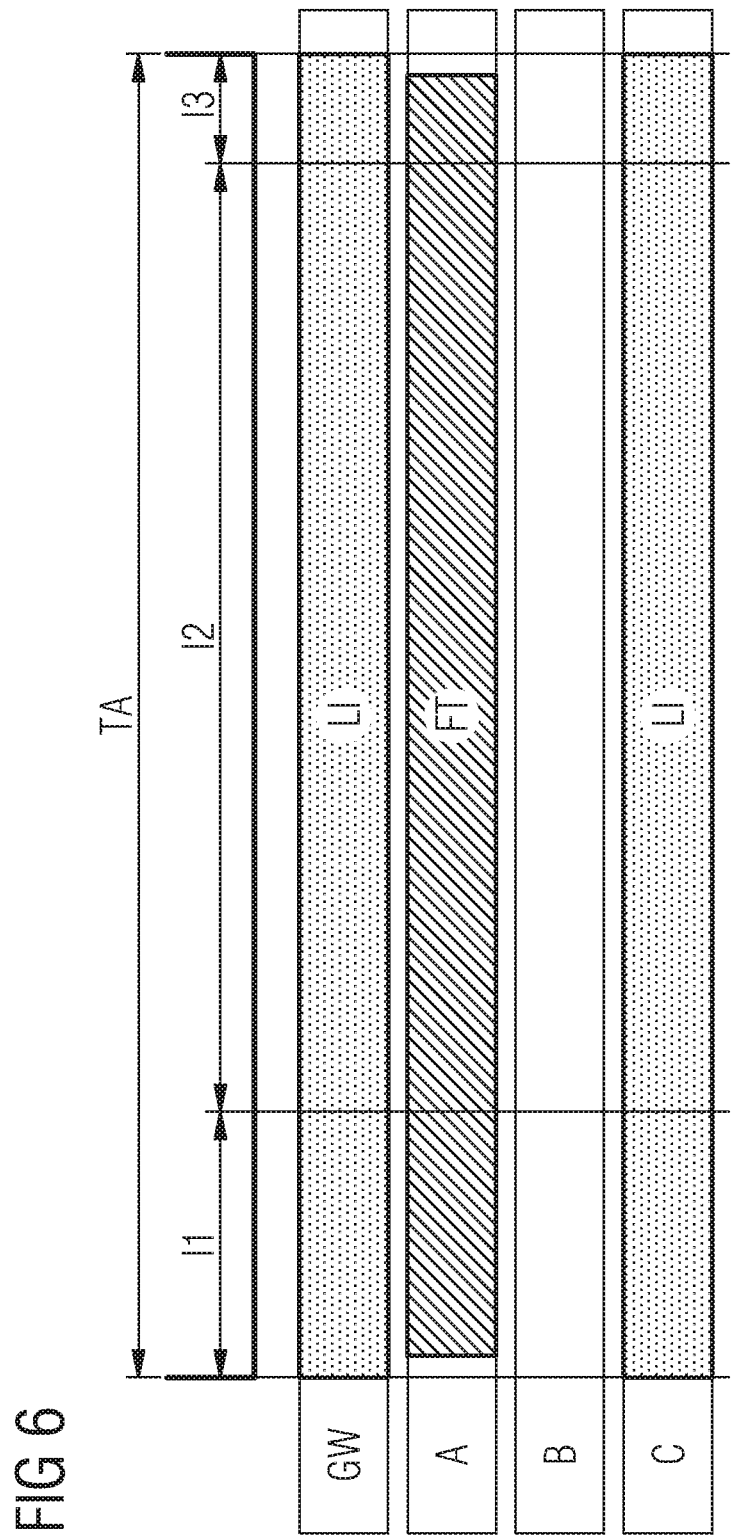
FIG. 6 to FIG. 8 are diagrams illustrating different scenarios for transmitting data in accordance with an embodiment of the invention.
Figure 7:
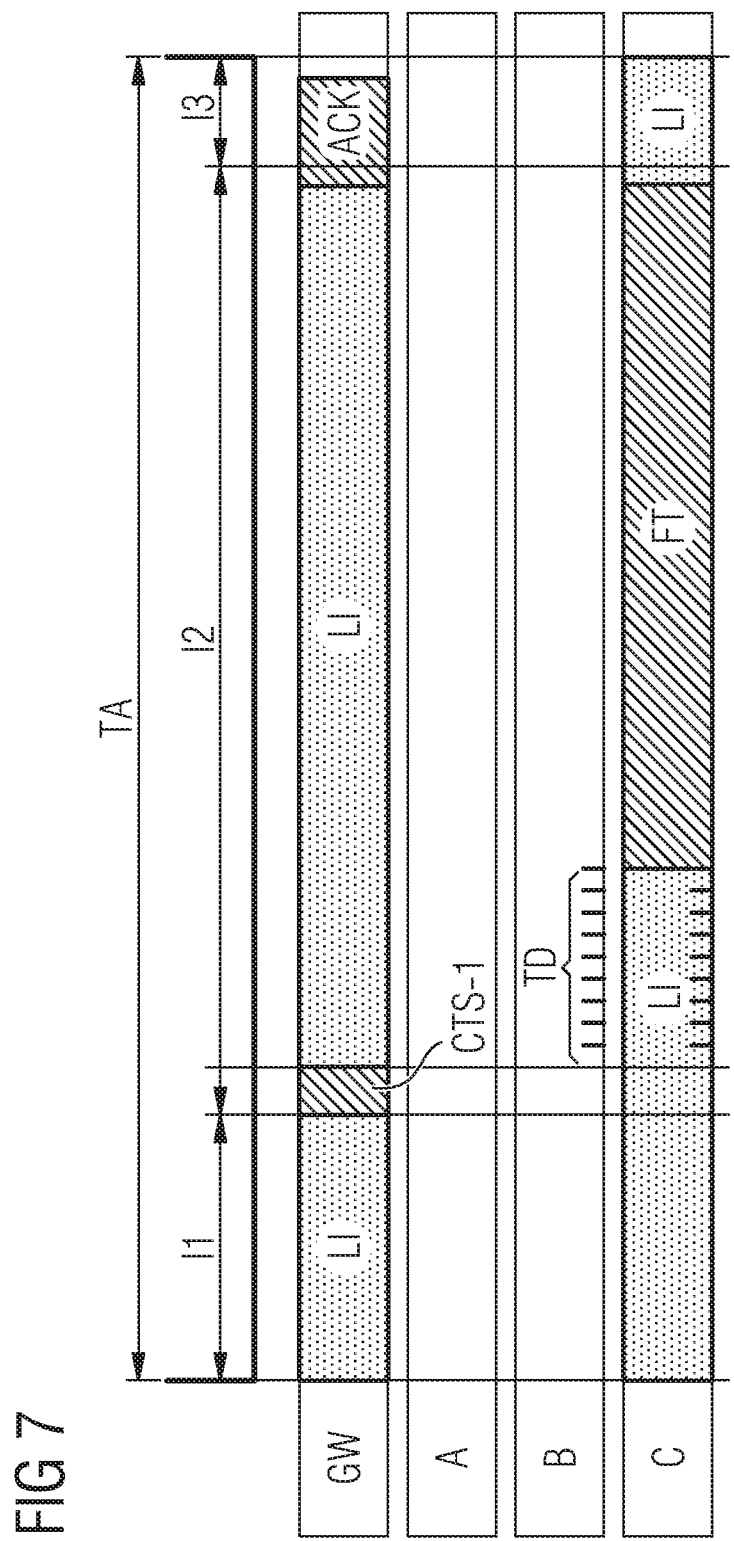
Figure 8:
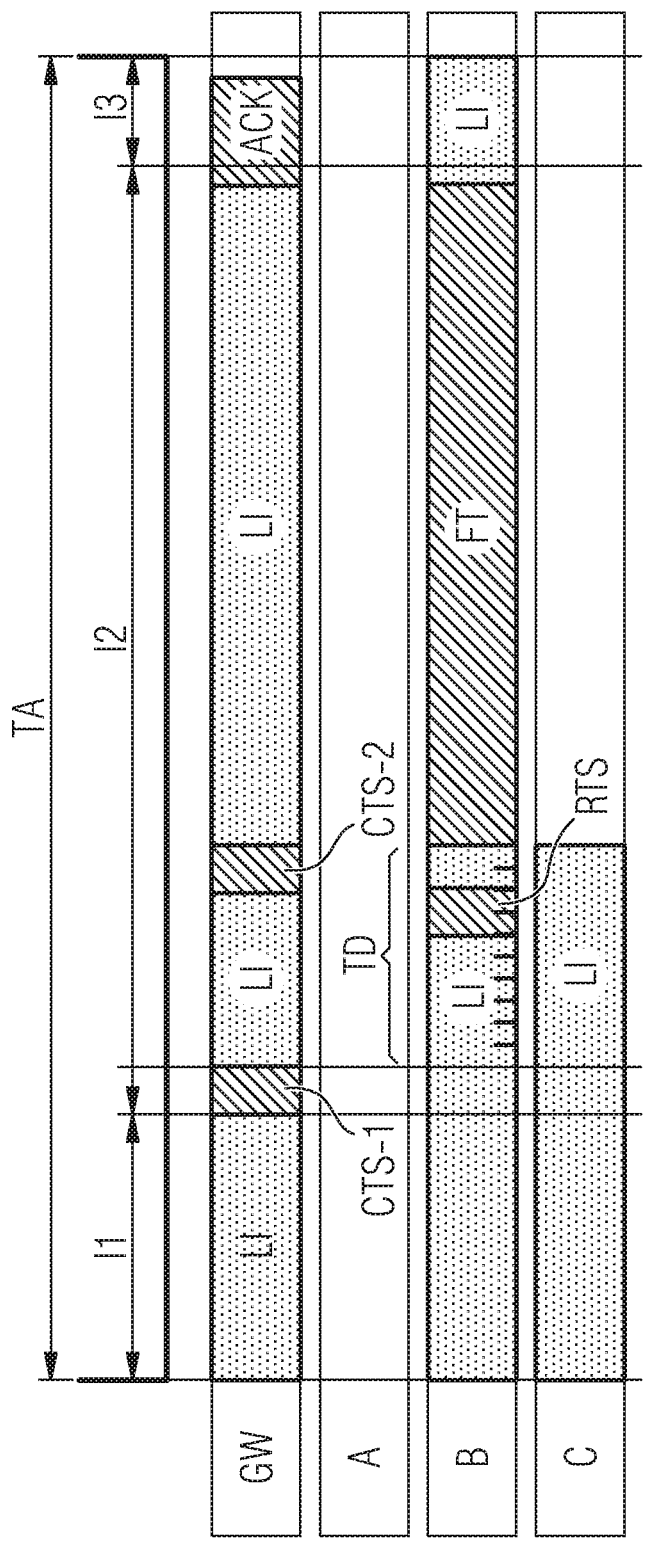

In the following, the method of the invention will be described based on different scenarios for data transmission in the network as shown in FIG. 1. For simplicity, it is assumed that first node D is switched off in the network, i.e., this first node D does not participate in the data transmission. Each of FIGS. 6 to 8 shows a shared group time slot TA that is owned by the first node A. Each of the FIGS. 6 to 8 indicates the behaviour of the gateway GW and the behaviour of the first nodes A to C in different transmission scenarios. As already explained with respect to FIG. 1, first nodes A and B are within reach of each other, whereas sensor node C is out of reach of sensor nodes A and B. In FIGS. 6 to 8, time intervals in which a node listens to the radio interface and does not transmit data are indicated by dotted bars having reference numeral LI (LI=listen). In contrast, the transmission of messages performed by a node are indicated by hatched bars having reference numeral FT (FT=frame transmission). The status of the nodes in white sections of the bars in FIGS. 6 to 8 might be listen or sleep and are not relevant in the following description. Hence, the status in these sections is not indicated.

FIG. 6 shows a scenario where first node A transmits data within the time slot TA owned by first node A, and first node C would like to use time slot TA for a data transmission. The data transmission of first node A starts within the time interval I1 and is indicated by the bar FT. Within time slot TA, the gateway GW will constantly listen to the radio interface but it will not send any messages. Furthermore, first node C, which cannot hear the frame transmission of node A, will also constantly listen to the radio interface without detecting any frame transmission. First node C does not receive a CTS packet CTS-1. As a result, first node C will not start its data transmission in interval I2. Therefore, the data transmission by first node A will not be disturbed.

FIG. 7 shows a scenario where first node A does not start transmitting data within the time interval I1 and first node C would like to use time slot TA for a data transmission. Gateway GW detects that first node A has not started transmitting data within time interval I1. Gateway GW will broadcast the above described CTS packet CTS-1. This packet is received by all first nodes A to C that can start a contention based access within the time slot I2 after having received the packet CTS-1. FIG. 7 thus illustrates an embodiment where a contention based access using a CSMA/CA method is used without transmitting the above described packets RTS and CTS-2. Hence, in the presently contemplated embodiment, collisions may occur between first nodes not in reach to each other and wishing to send data. In the scenario of FIG. 7, only first node C intends to send data based on a CSMA/CA method within the time interval I2. The random delay occurring in the CSMA/CA method until node C starts frame transmission FT is indicated by reference numeral TD in FIG. 7. After this random delay TD, the frame transmission FT occurs without collisions because neither first node A nor first node B wish to send data using a contention based method. FIG. 7 shows an acknowledged data transmission where, after the transmission of the frame to gateway GW, a corresponding acknowledgment ACK is transmitted by gateway GW.

FIG. 8 shows a scenario implementing a method in accordance with the disclosed embodiments of the invention where the above described messages RTS and CTS-2 are transmitted. In FIG. 8, first node A does not start transmitting data within the time interval I1 and first nodes B and C seek to use time slot TA for a data transmission. As a consequence, the packet CTS-1 is initially broadcast by the gateway GW. Upon receipt of the packet CTS-1, all first nodes A to C may use the time slot TA for contention based access. In the scenario of FIG. 8, both first nodes B and C wish to send data within the time interval I2. To do so, a CSMA/CA method is used for sending the packet RTS by nodes B and C. In the scenario of FIG. 8, the randomly selected time for sending the packet RTS is such that node B sends the packet RTS first. This packet is received by gateway GW, which answers by a corresponding CTS packet CTS-2 including the address of first node B. Both first nodes B and C receive packet CTS-2. First node B will recognize that the packet CTS-2 includes its address as the destination address SDA and will start frame transmission FT thereafter. The total delay induced by the CSMA/CA method until frame transmission is indicated in FIG. 8 by reference numeral TD. In contrast, node C determines that its own address is different from the destination address of packet CTS-2. As a result, first node C will not start a frame transmission FT. Analogously to the scenario of FIG. 7, the frame transmission FT is acknowledged by gateway GW with a corresponding acknowledgement ACK.

The embodiments of the invention described in the foregoing solve the hidden node problem which results in collisions of data transmissions from first nodes that are not within reach of each other for a TDMA based access, and also for a contention based access within personal area networks, i.e., based on the IEEE standard 802.15.4e. As the hidden node problem no longer occurs in the above described embodiments, the reliability of data transmissions in a network is improved.

Figure 9:
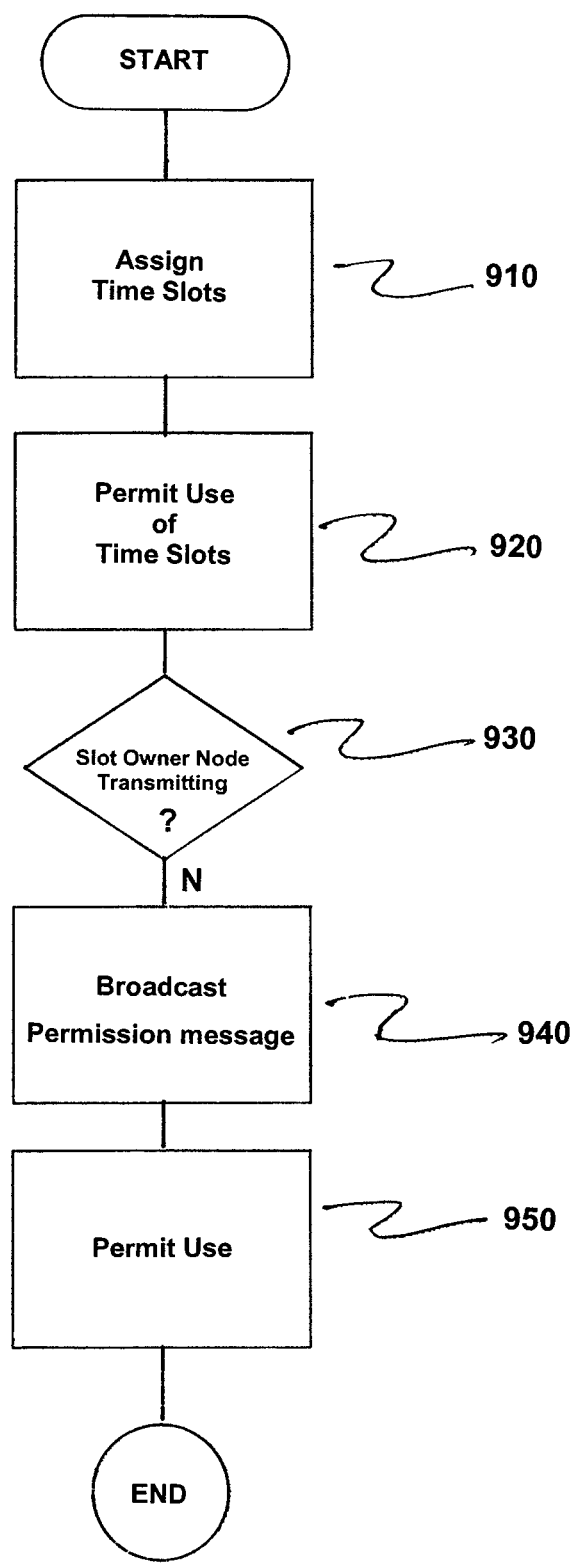
FIG. 9 is a flow chart illustrating the method in accordance with an embodiment of the invention.

FIG. 9 is a flow chart of a method for data transmission in a local area network, where the data is transmitted on a medium access control layer within successive time frames between a plurality of first nodes comprising client nodes and a second node within reach of the plurality of first nodes and a coordinator node for the plurality of first nodes, and a time frame comprising a plurality of time slots. The method comprises assigning each of the plurality of time slots to a first node of the plurality of the first nodes which is a slot owner node being exclusively allowed to start transmitting data at a time within a first interval at a beginning of a time slot of the plurality of time slots, as indicated in step 910.

One or more of the first nodes of the plurality of first nodes is permitted to use the time slot of the plurality of time slots using a contention based access to transmit the data in a second interval succeeding the first interval in cases in which a slot owner node has not started transmitting data at a time within the first interval, as indicated in step 920.

At an end of the first interval the second node determines whether the slot owner node has started transmitting data, as indicated in step 930. The second node broadcasts a permission message in the local area network, if the second node determines that the slot owner node has not started transmitting the data, as indicated in step 940.

Each first node of the plurality of nodes is permitted to use the time slot of the plurality of times slot using the contention based access to transmit the date only after receiving the permission message from the second node, as indicated in step 950.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention.

Moreover, it should be recognized that methods and structures shown and/or described in connection with any disclosed form or embodiment of the invention may be incorporated in any other disclosed or described or suggested form or embodiment as a general matter of design choice.

The invention claimed is:

1. A method for data transmission in a local area network, the data being transmitted on a medium access control layer within successive time frames between a plurality of first nodes comprising client nodes and a second node within reach of the plurality of first nodes and a coordinator node for the plurality of first nodes, and a time frame comprising a plurality of time slots, the method comprising:
   assigning each of the plurality of time slots to a first node of the plurality of the first nodes which is a slot owner node being exclusively allowed to start transmitting data at a time within a first interval at a beginning of a time slot of the plurality of time slots;
   permitting one or more first nodes of the plurality of first nodes to use the time slot of the plurality of time slots using a contention based access to transmit the data in a second interval succeeding the first interval in cases in which a slot owner node has not started transmitting data at a time within the first interval;
   determining by the second node, at an end of the first interval whether the slot owner node has started transmitting data;
   broadcasting, by the second node, a permission message in the local area network, if the second node determines that the slot owner node has not started transmitting the data; and
   permitting each first node of the plurality of nodes to use the time slot of the plurality of times slot using the contention based access to transmit the date only after receiving the permission message from the second node.

2. The method according to claim 1, wherein the data is transmitted in a wireless personal area network, each first node of the plurality of first nodes representing a sensor transmitting sensor data to the second node which represents a base station in the sensor network.

3. The method according to claim 2, wherein the data in the wireless personal area network is transmitted in accordance with IEEE standard 802.15.4e.

4. The method according to claim 2, wherein the wireless personal area network comprises a wireless sensor network.

5. The method according to claim 1, wherein the contention based access is based on a Carrier Sense Multiple Access/Collision Avoidance method.

6. The method according to claim 1, wherein the permission message includes at least an identification of its message type.

7. The method of claim 6, wherein the permission message further includes an identification of at least one of the second node and the local area network to which the second node belongs.

8. The method according to claim 7, wherein the permission message does not include a reserved time length.

9. The method according to claim 6, wherein the permission message does not include a reserved time length.

10. The method according to claim 1, further comprising:
sending, initially from each first node of the plurality of first nodes intending to use the time slot of the plurality of times slot using the contention based access to transmit the data, a request message in the local area network within the second interval;
broadcasting, by the second node in the local area network, an admission message identifying the first node of the plurality of first nodes from which the request message originates upon a first receipt of a request message at the second node within the second interval;
wherein each first node of the plurality of first nodes the admission message and not being identified in the admission message refrains from a data transmission; and
wherein the first node of the plurality of first nodes receiving the admission message and being identified in the admission message starts transmitting its data.

11. The method according to claim 10, wherein the request message at least includes an identification of its message type and an identification of the first node of the plurality of first nodes which has sent the request message.

12. The method according to claim 10, wherein the request message is sent using a contention based access.

13. The method according to claim 12, wherein the contention based access is a Carrier Sense Multiple Access/Collision Avoidance method.

14. The method according to claim 10, wherein the admission message includes at least an identification of its message type and an identification of the first node of the plurality of first nodes from which the corresponding request message originates.

15. The method according to claim 10, wherein at least one of the request message and the admission message further includes an identification of at least one of the second node and the local area network to which the second node belongs.

16. The method according to claim 10, wherein at least one of the request message and the admission message does not include a reserved time length.

17. The method according to claim 10, wherein at least one of the permission message, the request message and the admission message have a common command frame format, particularly the command frame format defined in IEEE standard 802.15.4e.

18. The method according to 10, wherein the common command frame format is the command frame format defined in IEEE standard 802.15.4e.

19. The method according to claim 1, wherein the second node sends an acknowledgement after receiving data from the slot owner node, the acknowledgement being sent in a synchronizing slot at a beginning of a next time frame.

20. The method according to claim 1, wherein the second node sends an acknowledgement after receiving data using the contention based access, the acknowledgement being sent within the time slot of the plurality of time slots in which the data is received using the contention based access.

21. The method according to claim 1, wherein the time slot of the plurality of time slots includes a third time interval succeeding the second time interval being used to send network announcements by the second node f no data is transmitted within the first and second intervals.

22. A local area network, comprising:
a plurality of first nodes comprising client nodes and a second node within reach of the plurality of first nodes; and
a coordinator node for the plurality of first nodes;
wherein the network is configured for data transmission on a medium access control layer within successive time frames between the plurality of first nodes and the second node, a time frame comprising a plurality of time slots;
wherein each time slot of the plurality of time slots is assigned to a first node of the plurality of first nodes which is a slot owner node being exclusively allowed to start transmitting data at a time within a first interval at the beginning of the time slot of the plurality of time slots;
wherein at least one first node of the plurality of first nodes is permitted to use the time slot based on a contention based access to transmit the data in a second interval succeeding the first interval in cases in which the slot owner node has not started to transmit the data at a time within the first interval;
wherein at an end of the first interval the second node determines whether the slot owner node has started to transmit the data;
wherein the second node broadcasts a permission message in the local area network, if it determines that the slot owner node has not started transmitting data; and
wherein each first node of the plurality of first nodes is allowed to use the time slot of the plurality of time slots based on the contention based access to transmit the data only after receiving the permission message from the second node.

23. The network according to claim 22, wherein the network is configured to transmit the data in a wireless personal area network, each first node of the plurality of first nodes representing a sensor transmitting sensor data to the second node which represents a base station in the sensor network.

24. A node implemented in a method for data transmission in a local area network, wherein data is transmitted on a Media Access Control (MAC) layer within successive time frames between a plurality of first nodes comprising client nodes, and the node including a processor and memory and being within reach of the plurality of first nodes and comprising a coordinator node for the plurality of first nodes, a time frame comprising a plurality of time slots,
wherein each time slot is assigned to a first node of the plurality of first nodes which is a slot owner node being exclusively allowed to start transmitting data at a time within a first interval at a beginning of a time slot of the plurality of time slots;
wherein at least one first node of the plurality of first nodes are allowed to use the time slot via a contention based access for transmitting data in a second interval succeeding the first interval during cases in which the slot owner node has not started transmitting data at the time within the first interval;
wherein the processor causes the node to determine whether the slot owner node has started transmitting data at the end of the first interval; and
wherein the processor causes the node to broadcast a permission message in the local area network, if the slot owner node has not started transmitting data, the permission message allowing each first node of the plurality of first nodes to use the time slot via a contention based access for transmitting data only after receiving the permission message from the node.

* * * * *